United States Patent
Farris et al.

(10) Patent No.: US 8,158,296 B2
(45) Date of Patent: Apr. 17, 2012

(54) CIRCULATION CHECK FOR FUEL CELL COOLANT

(75) Inventors: Stephen Farris, Rochester, NY (US); Martin M. Hoch, Webster, NY (US); Eric L. Thompson, Livonia, NY (US); James S. Siepierski, Williamsville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/844,203

(22) Filed: Jul. 27, 2010

(65) Prior Publication Data
US 2010/0291456 A1 Nov. 18, 2010

Related U.S. Application Data

(62) Division of application No. 11/069,323, filed on Mar. 1, 2005, now Pat. No. 7,781,113.

(51) Int. Cl.
*H01M 8/04* (2006.01)

(52) U.S. Cl. .................. 429/437; 429/429

(58) Field of Classification Search .................. None
See application file for complete search history.

(56) References Cited

U.S. PATENT DOCUMENTS

| 4,611,654 A | 9/1986 | Buchsel |
| 6,214,486 B1 * | 4/2001 | Okamoto ............ 429/434 |
| 6,874,480 B1 * | 4/2005 | Ismailov ............ 123/494 |
| 2003/0031905 A1 | 2/2003 | Saito et al. |

* cited by examiner

*Primary Examiner* — Jonathan Crepeau
(74) *Attorney, Agent, or Firm* — BrooksGroup

(57) ABSTRACT

Systems of checking thermal-induced circulation of a coolant in a fuel cell stack are disclosed. The system includes coolant inlet and outlet lines extending from a fuel cell stack. A pump and a radiator are confluently connected to the coolant inlet and coolant outlet lines. In one embodiment, a valve (either check type or automatic type) is provided in the coolant outlet line at the bottom of the fuel cell stack to prevent the flow of cold coolant from the coolant outlet line into the fuel cell stack upon start-up of the fuel cell stack. In another embodiment, a valve (either one-way flow control type or automatic type) is provided in the coolant inlet line at the top of the fuel cell stack. A method of checking thermal-induced circulation of a coolant in a fuel cell stack is also disclosed.

6 Claims, 1 Drawing Sheet

CIRCULATION CHECK FOR FUEL CELL COOLANT

CROSS-REFERENCE TO RELATED APPLICATIONS

This application is a divisional of U.S. application Ser. No. 11/069,323 filed Mar. 1, 2005 U.S. Pat. No. 7,781,113.

FIELD OF THE INVENTION

The present invention relates to cooling systems for fuel cells. More particularly, the present invention relates to a method for maintaining heat distribution in a fuel cell stack to decrease the time required to warm the stack on start-up and mitigate the formation of hot spots in the stack.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

Fuel cells include three components: a cathode, an anode and an electrolyte which is sandwiched between the cathode and the anode and passes only protons. Each electrode is coated on one side by a catalyst. In operation, the catalyst on the anode splits hydrogen into electrons and protons. The electrons are distributed as electric current from the anode, through a drive motor and then to the cathode, whereas the protons migrate from the anode, through the electrolyte to the cathode. The catalyst on the cathode combines the protons with electrons returning from the drive motor and oxygen from the air to form water. Individual fuel cells can be stacked together in series to generate increasingly larger quantities of electricity.

While they are a promising development in automotive technology, fuel cells are characterized by a high operating temperature which presents a significant design challenge from the standpoint of maintaining the structural and operational integrity of the fuel cell stack. Maintaining the fuel cell stack within the temperature ranges that are required for optimum fuel cell operation depends on a highly-efficient cooling system which is suitable for the purpose.

During startup of a PEM (polymer electrolyte membrane) fuel cell, the faster a fuel cell stack is able to reach operating temperatures, the better the performance of the fuel cell. Due to localized heating of the MEA (membrane electrode assembly) resulting from the electro-chemical reaction of hydrogen and oxygen, adequate removal of heat from the MEA is required. Previous methods of terminating operation of the coolant pump have proven to help heat up the stack at a faster rate; however, because the coolant being heated will migrate out of the stack, arrival at operating temperature is delayed.

The design operating temperature for a fuel cell stack is typically in the 65~80 degrees C. range. During a cold start from a temperature of 5 degrees C., fuel cell stack waste heat is utilized to rapidly bring the temperature of the stack up to its design operating temperature. When the design operating temperature is reached, a coolant pump is started for rejecting waste heat and preventing temperature overshoot.

It is important that the coolant pump not start too early since this will cause the desired operating temperature not to be reached or to be delayed. However, it has been discovered that coolant will migrate and circulate even if the coolant pump is not in operation, especially if the stack is started in cold weather. This is due to the thermally induced gradients of density, viscosity, and capillarity between hot and cold coolant. When coolant is heated in the stack, it migrates from the cells into the coolant manifold, where it then rises because it is lighter than the relatively cold coolant in the coolant system piping. The colder coolant, in turn, falls back down into the stack by gravity. This rising of the warm coolant and falling of the cold coolant in the system causes a "Ferris wheel" effect in which warm coolant flows freely from the stack to the system piping and cold coolant flows from the system piping into the stack.

Accordingly, a check system and method is needed to prevent circulation due to thermal gradients in a fuel cell stack system.

SUMMARY OF THE INVENTION

The present invention is generally directed to a novel circulation check system and method to prevent thermally-induced circulation of coolant due to the presence of thermal gradients in a fuel cell stack system. In one embodiment, the gravity circulation check system includes a valve which is placed at a bottom coolant outlet of the fuel cell stack. During circulation of coolant, the coolant is pumped from the coolant outlet, through the valve and into a top coolant inlet of the fuel cell stack, respectively. When coolant circulation stops, the valve prevents the coolant from re-entering the stack through the coolant outlet. In another embodiment, the circulation check system includes a valve positioned in a coolant discharge conduit at the top of the fuel cell stack. When circulation of the coolant stops, the valve closes and prevents gravity-induced circulation of the coolant.

BRIEF DESCRIPTION OF THE DRAWINGS

The invention will now be described, by way of example, with reference to the accompanying drawings, in which.

DETAILED DESCRIPTION OF THE INVENTION

Figure 1:
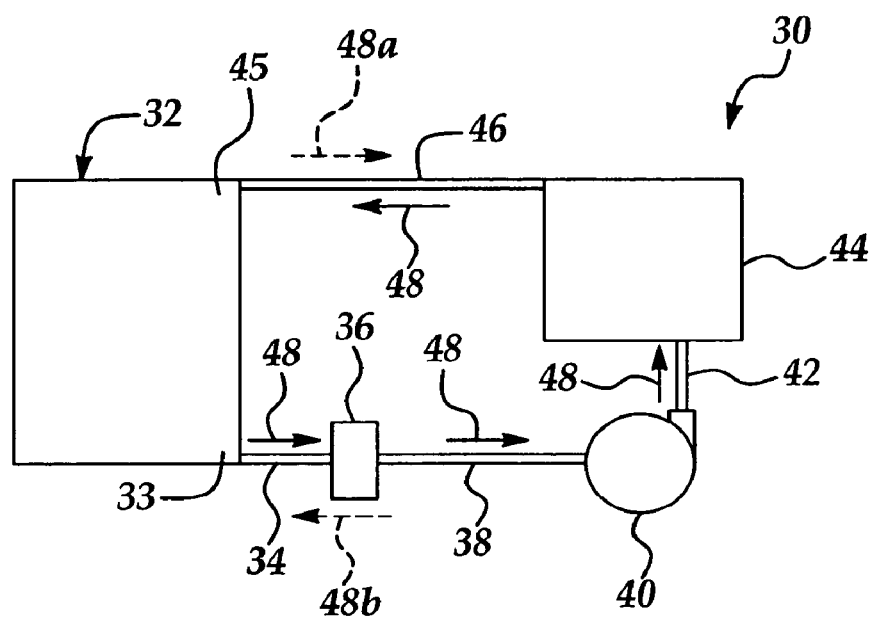
FIG. 1 is a schematic view of a circulation check system according to a first embodiment of the present invention.

Referring initially to FIG. 1, a circulation check system according to one embodiment of the present invention is generally indicated by reference numeral 30 and is designed for a fuel cell stack 32 in which a coolant 48 is pumped into the top of the stack 32. The circulation check system 30 is designed to prevent flow of the coolant 48 due to thermal gradients which remain in the coolant 48, particularly during start-up of the fuel cell stack 32. The circulation check system 30 includes a coolant outlet line 34 which extends from a coolant outlet 33 at the bottom of the fuel cell stack 32. A valve 36 (either a check type or automatic type) is provided in the coolant outlet line 34, and a pump inlet line 38 extends from the check valve 36. The pump inlet line 38 is provided in fluid communication with a coolant pump 40, which is connected to a radiator 44 through a pump outlet line 42. A coolant inlet line 46 connects the outlet of the radiator 44 to a coolant inlet 45 at the top of the fuel cell stack 32.

During operation of the fuel cell stack 32, after the fuel cell stack 32 reaches the design operating temperature of typically about 65~80 degrees C., the coolant pump 40 pumps the coolant 48 from the fuel cell stack 32 through the bottom coolant outlet 33 and then through the coolant outlet line 34, valve 36, pump inlet line 38, pump outlet line 42 and radiator 44, respectively. In the radiator 44, thermal energy from the coolant 48 is dissipated to air flowing through the radiator 44. The coolant 48 flows from the radiator 44 through the coolant inlet line 46, and enters the fuel cell stack 32 through the top coolant inlet 45. As the coolant 48 is distributed throughout the fuel cell stack 32, heat generated by the fuel cell stack 32 is absorbed by the coolant 48. The coolant 48 then leaves the fuel cell stack 32 through the coolant outlet 33, and the cycle is repeated.

During start-up of the fuel cell stack 32, thermal gradients are induced in fuel cell stack 32. Consequently, the coolant 48 in the fuel cell stack 32 includes both warm portions and cold portions. Due to differences in density, viscosity, and capillarity between cold coolant 48 and warm coolant 48, the non-pumped coolant 48 has a tendency to migrate and circulate. Warm coolant 48 then rises from the stack 32 and enters the coolant inlet line 46, due to thermal gradients between the warmed coolant 48 and the cold coolant 48. Similarly cold coolant 48 enters stack 32 and replaces the warmed coolant. Were it not for the presence of the valve 36 in the coolant outlet line 36, this would result in movement of warm coolant 48a from the stack 32 into the coolant inlet line 46 and movement of the cold coolant 48b from the coolant outlet line 34 into the stack 32, as indicated by the dashed arrows. The outflow of warm coolant 48a from the fuel cell stack 32 and the influx of cold coolant 48b from the coolant outlet line 34 into the fuel cell stack 32 would therefore tend to cool the stack 32 upon start-up of the fuel cell stack 32, whereas rapid heating of the coolant 48 upon start-up is desired to attain operating temperatures as rapidly as possible.

During start-up of the fuel cell stack 32, valve 36 prevents the reverse flow of cold coolant 48b from the coolant outlet line 34 and into the coolant outlet 33 of the fuel cell stack 32, as well as the flow of warm coolant 48a from the fuel cell stack 32 through the coolant inlet line 46. Consequently, due to the waste heat which remains in the coolant 48, the coolant 48 which remains in the fuel cell stack 32 is closer to the operating temperatures of the stack 32 at startup, thereby reducing the time required to bring the temperature of the coolant 48 up to the operating temperature and increasing the performance of the fuel cell.

Figure 2:
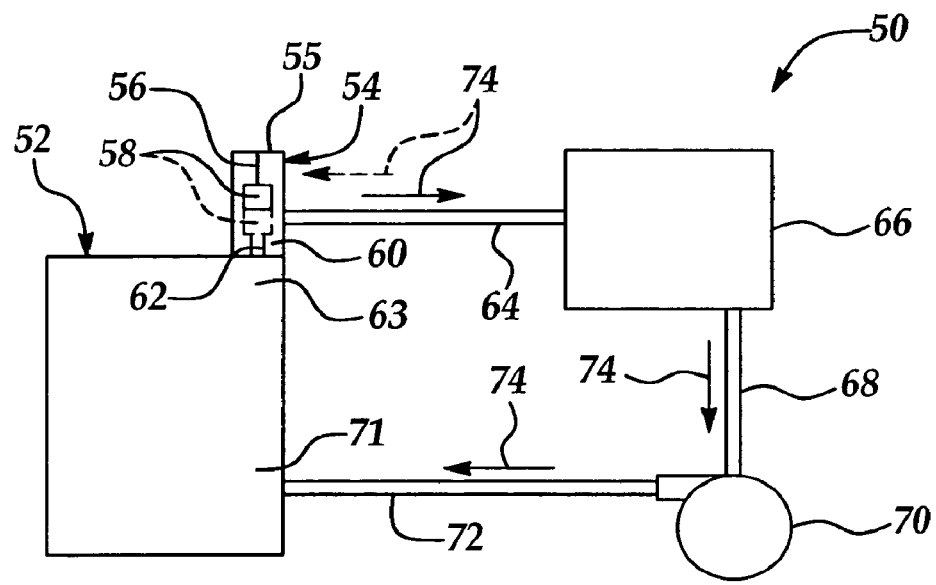
FIG. 2 is a schematic view of a circulation check system according to a second embodiment of the present invention.

Referring next to FIG. 2, a circulation check system according to a second embodiment of the present invention is generally indicated by reference numeral 50 and is designed for a fuel cell stack 52 in which a coolant 74 is pumped into the bottom of the stack 52. The circulation check system 50 is designed to prevent gravity flow of the coolant 74 due to thermal gradients which remain in the coolant 74, particularly during subsequent start-up of the fuel cell stack 52. The circulation check system 50 includes a coolant outlet line 64 which extends from valve 54 (either flow control type or automatic type) at the top of the fuel cell stack 52. Valve 54 is provided in fluid communication with a coolant outlet 63 of the fuel cell stack 52. A radiator 66 is connected to the coolant outlet line 64, and a pump inlet line 68 connects the radiator 66 to a coolant pump 70. A coolant inlet line 72 connects the outlet of the coolant pump 70 to a coolant inlet 71 at the bottom of the fuel cell stack 52.

If valve 54 is of the flow control type it includes a valve housing 55 in which is provided a valve stem 56. A valve weight 58 is slidably mounted on the valve stem 56. A valve seat 60 is provided in the bottom of the valve housing 55. A coolant opening 62 extends through the valve seat 60 and normally establishes fluid communication between the coolant outlet 63 and the valve housing 55 when the flow control valve 54 is in the open position. As indicated by the dashed lines, the valve weight 58 is capable of seating against the valve seat 60 to block the coolant opening 62 during shutdown of coolant pump 70. During operation of the coolant pump 70, the weight 58 slides upwardly on the valve stem 56 to unblock the coolant opening 62 and allow flow of the coolant 74 from the fuel cell stack 52 to the coolant outlet line 64, as will be hereinafter further described. An example of a valve 54 (flow control type) which is suitable for the circulation check system 50 is the SA (straight or angle) flow control valve available from the Bell & Gossett Co.

During operation of the fuel cell stack 52, after the fuel cell stack 52 reaches the design operating temperature of typically about 65~80 degrees C., the coolant pump 70 pumps the coolant 74 from the fuel cell stack 52 through the top coolant outlet 63 and valve 54 respectively, and into the coolant outlet line 64. Upward pressure of the rising coolant 74 flowing upwardly through the coolant opening 62 of the valve (flow control type) seat 60 pushes the valve weight 58 upwardly on the valve stem 56. This facilitates flow of the coolant 74 from the coolant outlet 63, through valve 54 and into the coolant outlet line 64, respectively.

From the coolant outlet line 64, the coolant 74 flows through the radiator 66, the pump inlet line 68, the coolant pump 70 and the coolant inlet line 72, respectively, and enters the bottom coolant inlet 71 of the fuel cell stack 52. In the radiator 66, thermal energy from the coolant 74 is dissipated to air flowing through the radiator 66. As the coolant 74 is distributed throughout the fuel cell stack 52, heat generated by the fuel cell stack 52 is absorbed by the coolant 74. The coolant 74 again leaves the fuel cell stack 52 through the coolant outlet 63 and flow control valve 54, respectively, and the cycle is repeated.

During start-up of the fuel cell stack 52, thermal gradients are induced in the fuel cell stack 52. Consequently, coolant 74 includes both warm portions and cold portions. Due to differences in density, viscosity and capillarity between cold coolant 74 and warm coolant 74, coolant 74 has a tendency to migrate and circulate. Warm coolant 74 then rises in the stack 52, whereas cold coolant 74 falls through the stack 52. However, flow of warm coolant 74 from the fuel cell stack 52 and into the coolant outlet line 64 is prevented by valve 54, since upon shutdown of the coolant pump 70, the warm coolant 74 does not push upwardly against the valve (flow control type) weight 58 with a force which is necessary to raise the valve weight 58 from the valve seat 62 to unblock the coolant opening 62. This maintains the warm coolant 74 in the fuel cell stack 52 and prevents cooling of the stack 52 during start-up of the fuel cell stack 52, thereby facilitating rapid heating of the coolant 74 upon start-up to attain operating temperatures as rapidly as possible.

While the preferred embodiments of the invention have been described above, it will be recognized and understood that various modifications can be made in the invention and the appended claims are intended to cover all such modifications which may fall within the spirit and scope of the invention.

What is claimed is:
1. A circulation check system comprising:
   a fuel cell stack having a coolant inlet in a lower portion of the fuel cell stack and a coolant outlet in an upper portion of the fuel cell stack in fluid communication with a coolant outlet line;
   a pump for pumping the coolant from the fuel cell stack through the coolant outlet and into the coolant outlet line; and
   a valve comprising a flow control or automatic type provided in fluid communication with the coolant outlet, the valve comprising a valve housing having a valve seat in a bottom portion of the valve housing, a valve stem adjacent to the valve seat, a valve weight slidably mounted on the valve stem, and a coolant opening extending through the valve seat, wherein the valve weight rests against the valve seat and blocks the coolant opening to close the valve during shutdown of the pump, but, during operation of the pump, the valve weight is pushed upwardly on the valve stem, which opens the valve and establishes fluid communication between the coolant outlet, the coolant opening in the valve seat, and the coolant outlet line.

2. The system of claim 1 further comprising a radiator in fluid communication with the coolant outlet line, and, wherein, during start-up of the fuel cell stack, the pump operates to open the valve and circulate the coolant through the fuel cell stack where heat is absorbed by the coolant, into the coolant outlet line, and further into the radiator so that thermal energy absorbed by the coolant may be dissipated.

3. A coolant circulation check system comprising:
  a fuel cell stack having a coolant inlet and a coolant outlet in fluid communication with a coolant outlet line;
  a pump for pumping a coolant from the fuel cell stack through the coolant outlet and into the coolant outlet line; and
  a valve comprising a one-way flow control type or automatic type provided in fluid communication with the coolant outlet, wherein the valve comprises a valve housing, a valve seat having a coolant opening provided in the valve housing, a valve stem provided in the valve housing adjacent to the valve seat, and a valve weight slidably mounted on the valve stem for engaging the valve seat to block the coolant opening and close the valve during shutdown of the pump and start-up of the fuel cell stack, the valve weight being such that warm coolant rising in the stack does not push upwardly against the valve weight with a force sufficient to raise the valve weight from the valve seat and unblock the coolant opening during shutdown of the pump and start-up of the fuel cell stack.

4. The system of claim 3 further comprising a radiator provided in fluid communication with the coolant outlet line, wherein, after the fuel cell stack reaches a design operating temperature, the pump operates to circulate the coolant through the fuel cell stack so that upward pressure of the coolant rising through the coolant opening of the valve seat pushes the valve weight upwardly on the valve stem to open the valve so that the coolant can flow from the coolant outlet, through the valve into the coolant outlet line and into the radiator.

5. A coolant circulation check system comprising:
  a fuel cell stack having a coolant inlet at a lower portion of the fuel cell stack and a coolant outlet in fluid communication with a coolant outlet line at an upper portion of the fuel cell stack; and
  a flow control or automatic type valve in fluid communication with the coolant outlet at the upper portion of the fuel cell stack, the valve comprising a valve seat and a valve weight for engaging the valve seat to block the coolant outlet and close the valve; and
  a pump for pumping a coolant from the fuel cell stack through the coolant outlet and into the coolant outlet line, wherein a gravitational force on the valve weight is sufficient to block the coolant outlet during shutdown of the pump and prevent thermally induced circulation of the coolant from the coolant outlet during start-up of the fuel cell stack, and an upward force of the pumped coolant on the valve weight during operation of the pump is sufficient to raise the valve weight from the valve seat to unblock the coolant outlet and facilitate flow of the coolant from the fuel cell stack.

6. A coolant circulation check system comprising:
  a fuel cell stack having a coolant inlet and a coolant outlet
  a pump for pumping a coolant from the fuel cell stack through the coolant outlet; and
  a pressure-activated valve in fluid communication with the coolant outlet, the valve comprising a valve housing having a valve seat, a valve stem adjacent to the valve seat, a valve weight slidably mounted on the valve stem, and a coolant opening extending through the valve seat, wherein the valve weight rests against the valve seat and blocks the coolant opening to close the valve during shutdown of the pump, but, during operation of the pump, the valve weight slides upwardly on the valve stem and pushes the valve stem away from the valve seat to open the valve and establish fluid communication between the coolant outlet of the fuel cell stack and the coolant opening of the valve seat.

* * * * *